(12) United States Patent
Koo et al.

(10) Patent No.: US 8,303,859 B2
(45) Date of Patent: Nov. 6, 2012

(54) OPTICAL FILM FOR SUPPRESSING NEAR INFRARED RAY TRANSMITTANCE AND DISPLAY FILTER USING THE SAME

(75) Inventors: Young Kwon Koo, Uiwang-si (KR); Byoung Hoo Lee, Uiwang-si (KR); Kyoung Ku Kang, Uiwang-si (KR)

(73) Assignee: Cheil Industries, Inc., Gumi-si, Gyeongsangbuk-do (KR)

( * ) Notice: Subject to any disclaimer, the term of this patent is extended or adjusted under 35 U.S.C. 154(b) by 197 days.

(21) Appl. No.: 12/801,759

(22) Filed: Jun. 23, 2010

(65) Prior Publication Data

US 2011/0012073 A1 Jan. 20, 2011

Related U.S. Application Data

(63) Continuation of application No. PCT/KR2008/007657, filed on Dec. 24, 2008.

(30) Foreign Application Priority Data

Dec. 24, 2007 (KR) .................. 10-2007-0136595
Dec. 24, 2008 (KR) .................. 10-2008-0132826

(51) Int. Cl.
*G02B 5/23* (2006.01)
*G02B 5/22* (2006.01)

(52) U.S. Cl. ........ 252/586; 252/587; 359/350; 359/885; 428/1.3; 428/212; 430/7; 430/270.1

(58) Field of Classification Search ............... 252/587, 252/586; 361/679.21, 709; 428/329, 1.3, 428/212; 430/270.1, 7; 315/111.21; 359/350, 359/885

See application file for complete search history.

(56) References Cited

U.S. PATENT DOCUMENTS

| | | | |
|---|---|---|---|
| 5,804,102 A | | 9/1998 | Oi et al. |
| 6,680,009 B2 * | | 1/2004 | Harada et al. .................. 252/587 |
| 7,019,049 B1 * | | 3/2006 | Yoo et al. ...................... 523/201 |
| 2005/0227164 A1 * | | 10/2005 | Park et al. .................. 430/270.1 |
| 2007/0224384 A1 * | | 9/2007 | Jeong et al. .................. 428/64.4 |
| 2009/0059489 A1 | | 3/2009 | Yoo et al. |

FOREIGN PATENT DOCUMENTS

| | | |
|---|---|---|
| JP | 10-139997 A | 5/1998 |
| KR | 10-2004-0110516 A | 12/2004 |
| KR | 10-2005-0095717 A | 9/2005 |
| KR | 10-2007-0087527 A | 8/2007 |

* cited by examiner

*Primary Examiner* — Bijan Ahvazi
(74) *Attorney, Agent, or Firm* — Lee & Morse, P.C.

(57) ABSTRACT

An optical film includes a near-infrared absorbing layer, the near-infrared absorbing layer containing at least one colorant having a maximum absorption wavelength in the range of 900 nm to 1,100 nm, and a transparent copolymer resin containing fine rubber particles.

15 Claims, 2 Drawing Sheets

OPTICAL FILM FOR SUPPRESSING NEAR INFRARED RAY TRANSMITTANCE AND DISPLAY FILTER USING THE SAME

CROSS-REFERENCE TO RELATED APPLICATION

This application is a continuation of pending International Application No. PCT/KR2008/007657, entitled "Optical Film for Suppressing Near Infrared Ray Transmittance and Display Filter Using the Same," which was filed on Dec. 24, 2008, and is hereby incorporated by reference in its entirety and for all purposes.

BACKGROUND

1. Field

Embodiments relate to an optical film for suppressing near-infrared ray transmittance and a display filter using the optical film.

2. Description of the Related Art

A large amount of near-infrared rays may be generated from a plasma display when a discharge gas emits UV rays to excite phosphors. The near-infrared rays may cause malfunction of remote controllers for household electric appliances around the plasma display as well as remote controllers for the plasma display itself.

SUMMARY

It is a feature of an embodiment to provide an optical film that can selectively absorb light in the range of 900 nm to 1,100 nm to prevent malfunction of infrared devices such as remote controllers and that is highly resistant to impact.

It is another feature of an embodiment to provide a display filter comprising the optical film.

At least one of the above and other features and advantages may be realized by providing an optical film, including a near-infrared absorbing layer, the near-infrared absorbing layer containing at least one colorant having a maximum absorption wavelength in the range of 900 nm to 1,100 nm, and a transparent copolymer resin containing fine rubber particles.

The fine rubber particles may have an average diameter of 1 μm or less.

The fine rubber particles may have an average diameter of 0.7 μm or less.

A difference in refractive index between the fine rubber particles and a matrix resin of the copolymer resin may be 0.01 or less.

The difference in refractive index between the fine rubber particles and the matrix resin may be 0.005 or less.

The copolymer resin may include one or more of an acrylonitrile butadiene styrene copolymer resin, a styrene butadiene styrene copolymer resin, and a styrene butadiene copolymer resin.

The copolymer resin may include a compound resin of: one or more of the acrylonitrile butadiene styrene copolymer resin, the styrene butadiene styrene copolymer resin, and the styrene butadiene copolymer resin; and one or more of ethylene vinyl acetate, ethylene ethyl acrylate, an olefin, a polycarbonate, an acrylic copolymer, and a polymethacrylate.

The fine rubber particles may include one or more of a butadiene rubber, an acrylic rubber, a nitrile rubber, a chloroprene rubber, and a chlorosulfonated polyethylene rubber.

The copolymer resin may have a total light transmittance of 90% or more and a haze of 2% or less.

The near-infrared absorbing layer may have a transmittance in the wavelength range of 900 nm to 1,100 nm of 30% or less, and a transmittance difference between a maximum transmittance and a minimum transmittance in the wavelength range of 900 nm to 1,100 nm of lower than 20%.

The colorant may include a thiol nickel complex, a diimmonium compound, a polymethine compound, an anthraquinone compound, a phthalocyanine compound, a naphthalocyanine compound, or a mixture thereof.

The copolymer resin may be present in amount of about 10 to about 90 parts by weight, based on 100 parts by weight of total solid content.

The colorant may be present in an amount of about 0.01 to about 30 parts by weight, based on 100 parts by weight of the copolymer resin.

The optical film may further include at least one color correction colorant, the at least one color correction colorant including one or more of an anthraquinone colorant, a perinone colorant, a methine colorant, a monoazo colorant, and a disazo colorant.

The near-infrared absorbing layer may be formed by coating a coating solution containing the colorant, a binder resin, and a solvent on a transparent substrate.

At least one of the above and other features and advantages may also be realized by providing a display filter including the optical film according to an embodiment.

BRIEF DESCRIPTION OF THE DRAWINGS

The above and other features and advantages will become more apparent to those of skill in the art by describing in detail example embodiments with reference to the attached drawings, in which.

DETAILED DESCRIPTION

Figure 1:
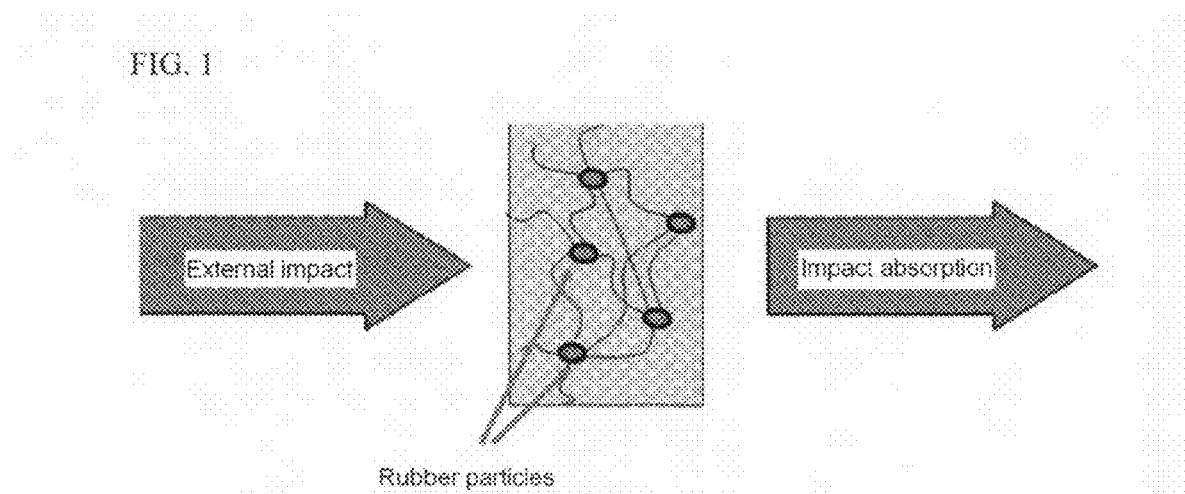
FIG. 1 illustrates a diagram simulating resistance against an external impact of a copolymer resin used in an optical film according to an embodiment.

Korean Patent Application No. 10-2007-0136595, filed on Dec. 24, 2007, and Korean Patent Application No. 10-2008-0132826, filed on Dec. 24, 2008, in the Korean Intellectual Property Office, and entitled: "Optical Film for Suppressing Near Infrared Ray Transmittance and Display Filter Using the Same," are each entirely incorporated by reference herein.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present.

An embodiment relates to an optical film that includes a near-infrared absorbing layer containing a colorant and an optically transparent copolymer resin. The colorant may have a maximum absorption wavelength in the range of 900 nm to 1,100 nm. The copolymer resin may contain fine rubber particles. The refractive index of the fine rubber particles may be controlled, as described in detail below.

The near-infrared absorbing layer of the optical film according to the present embodiment may effectively block near-infrared rays in the wavelength range of 900 nm to 1,100 nm due to the presence of the colorant having a maximum absorption wavelength in the range of 900 nm to 1,100 nm. In addition, the fine rubber particles contained in the optically transparent copolymer resin may impart impact dispersibility through impact absorption to improve the impact resistance of the optical film.

The near-infrared absorbing layer may be formed by, e.g., stirring one or more colorants in a solvent, adding the copolymer resin as a binder resin thereto to prepare a coating solution composition, coating the coating solution composition on a transparent substrate, and drying the coated substrate by heating. In another implementation, a solution of the binder resin in another solvent may be added to the colorant mixture.

Various materials may be used for the transparent substrate. For example, the transparent substrate may be a film made of a resin, where the resin includes one or more of a polyester resin, an acrylic resin, a cellulose resin, a polyethylene resin, a polypropylene resin, a polyolefin resin, a polyvinyl chloride resin, a polycarbonate resin, a phenolic resin, and a urethane resin. The transparent substrate may be used in optically transparent sheets and films, and in sheets and films that require color correction and absorption of specific wavelengths, but the use of the transparent substrate is not limited to the above functions.

In an example embodiment, the binder resin is preferably a copolymer resin whose refractive index is controlled as a whole and that can be made transparent. The fine rubber particles contained in the binder resin possess elasticity to impart impact dispersibility through impact absorption.

FIG. 1 illustrates a diagram simulating resistance against an external impact of a copolymer resin used in an optical film according to an embodiment. Referring to FIG. 1, the fine rubber particles dispersed in the matrix resin absorb an external impact in the binder resin of the near-infrared absorbing layer to bring about an improvement in the impact resistance of the optical film.

The fine rubber particles contained in the binder resin function to absorb and disperse an external impact when the binder resin is formed into a film. The size and refractive index of the fine rubber particles may be controlled to maintain the optical transparency corresponding to that of the matrix resin. Various fine particles of elastic rubbers may be used as the fine rubber particles. Examples of suitable fine rubber particles include fine particles of butadiene rubber, acrylic rubber, nitrile rubber, chloroprene rubber, and chlorosulfonated polyethylene rubber.

Examples of suitable transparent copolymer resins containing the fine rubber particles include acrylonitrile butadiene styrene (ABS) copolymer resins, styrene butadiene styrene (SBS) copolymer resins, styrene butadiene copolymer (SBC) resins, and mixtures of these copolymer resins with one or more miscible resins having excellent optical properties such as ethylene vinyl acetate (EVA), ethylene ethyl acrylate (EEA), olefin, polycarbonate, acrylic copolymers and polymethacrylate. The kind of the copolymer resin containing the optically transparent fine rubber particles is not limited to the aforementioned resins, and the kind of the resins miscible with the copolymer resin is not limited to the aforementioned resins.

Preferably, the transparency of the copolymer resin is maintained by optimizing the overall optical properties of the copolymer resin through size control and structure modification of the rubber particles.

Preferably, the copolymer resin has a total light transmittance of 90% or more and a haze of 2% or less.

The optically transparent rubber particles may have an average diameter of 1 $\mu$m or less in view of providing transmittance. It is particularly preferred that the rubber particles have an average diameter of 0.7 $\mu$m or less in order to form a coating film having a haze value of 2% or less. The haze value is defined as the sum of an external haze value determined by the roughness of the outer surface of the coating film and an internal haze value determined by the fine rubber particles and the copolymer resin contained in the coating film. Preferably, the rubber particles are homogeneously dispersed in the copolymer resin in order to achieve constant optical properties of the coating film as a whole. Homogenous dispersion of the rubber particles in the copolymer resin is also preferred in order to provide an ability of the coating film to absorb and disperse impact.

The term "haze" as used herein refers to the sum of an "external haze" and an "internal haze," and the "external haze" is a value determined by the roughness of the outer surface of the coating film and the "internal haze" means a value determined by the materials contained in the coating film. In order for the copolymer resin containing the fine rubber particles to have high transparency, it is preferred that the refractive indices of the matrix resin and the rubber particles be controlled. An optically colorless coating film with a low haze value, which is determined by an external haze and an internal haze, may be formed by controlling the difference in refractive index between the matrix resin and the rubber particles to 0.01 or less. For higher transparency and gloss of the coating film, the difference in refractive index between the rubber particles and the matrix resin is preferably controlled to 0.01 or less. In an implementation, the difference in refractive index between the fine rubber particles and the matrix resin is 0.005 or less.

The transparency, flowability, gloss, and impact resistance (as appearance, rheological, and mechanical properties, respectively) of the fine rubber particles and the matrix resin may be controlled depending on the dispersibility of the particles in the matrix resin, the difference in refractive index between the particles and the resin, and the particle size of the particles.

An example resin miscible with the copolymer resin is a resin that can be mixed in the preparation of the copolymer resin by polymerization. Another example resin miscible with the copolymer resin is a resin that can be dissolved in a solvent in the preparation of the coating solution.

In an example embodiment, the resin that can be mixed during polymerization to constitute repeating units of the copolymer resin can be mixed while maintaining the transparency of the copolymer resin. The refractive index of the miscible resin may be generally the same as that of the matrix resin, or the difference in refractive index between the miscible resin and the matrix resin is preferably not greater than 0.01 and more preferably not greater than 0.005 in terms of providing higher transparency and gloss.

In an example embodiment, the resin miscible with the copolymer resin in the preparation of the coating solution is miscible with, and soluble in a solvent in, the preparation of the coating solution. The refractive index of the miscible resin is the same as that of the matrix resin, or the difference in refractive index between the miscible resin and the matrix resin is preferably not greater than 0.01 and more preferably not greater than 0.005 in view of providing higher transparency and gloss. The coating solution may be white and in an opaque state. Thus, it is preferred to determine the refractive indices of the copolymer resin and the miscible resin before preparation of the coating solution.

The coating solution composition may be prepared by, e.g., mixing the transparent impact-absorbing copolymer resin and one or more resins miscible with the copolymer resin. The transparent resin is preferably one that exhibits excellent characteristics in terms of transparency, flowability, gloss, and impact resistance.

The copolymer resin is preferably present in amount of about 10 to about 90 parts by weight, and more preferably about 30 to about 70 parts by weight, based on 100 parts by weight of the total solid content.

The presence of the fine rubber particles in the transparent copolymer resin may ensure high impact resistance of the optical film.

Any suitable colorant commonly used in the art may be used in the optical film of the present embodiment. It is preferred to use a colorant having a maximum absorption wavelength in the range of 900 nm to 1,100 nm, the use of which may allow the near-infrared absorbing layer to have a transmittance of 30% or less, and a difference between the maximum transmittance and the minimum transmittance of 20% or less, in the wavelength range of 900 nm to 1,100 nm, thus enabling blocking of near-infrared rays in a more stable manner. The colorant may include, e.g., a thiol nickel complex, a diimmonium compound, a polymethine compound, an anthraquinone compound, a phthalocyanine compound, a naphthalocyanine compound, or a mixture thereof.

Specifically, the colorant may be, but is not limited to, the thiol nickel complex of Formula 1:

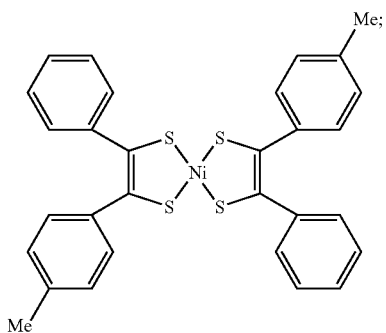

a diimmonium compound represented by Formula 2:

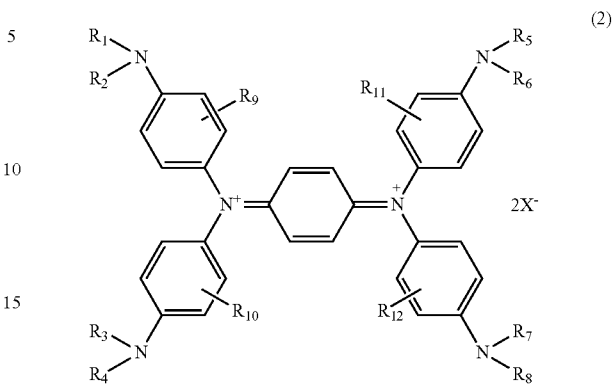

wherein $R_1$ and $R_8$ are independently (a) an alkyl group, such as methyl, ethyl, n-propyl, iso-propyl, n-butyl, iso-butyl, tert-butyl, n-amyl, n-hexyl, n-octyl, 2-hydroxyethyl, 2-cyanoethyl, 3-hydroxypropyl, 3-cyanopropyl, methoxyethyl, ethoxyethyl or butoxyethyl, (b) an aryl group, such as phenyl, fluorophenyl, chlorophenyl, tolyl, diethylaminophenyl or naphthyl, (c) an alkenyl group, such as vinyl, propenyl, butenyl or pentenyl, or (d) an aralkyl group, such as p-fluorobenzyl, p-chlorophenyl, phenylpropyl or naphthylethyl, $R_9$ to $R_{12}$ are independently a hydrogen atom, a fluorine atom, a chlorine atom, a bromine atom, a diethylamino group, a dimethylamino group, a cyano group, a nitro group, a methyl group, an ethyl group, a propyl group, a trifluoromethyl group, a methoxy group, an ethoxy group, or a propoxy group, and $X^-$ is a halogen ion, $RCO_2^-$ (R=alkyl or aryl), $RSO_3^-$ (R=alkyl or aryl), $NO_3^-$, $ClO_4^-$, $PF_6^-$, $SbF_6^-$, $BF_4^-$, $BR_4^-$ (R=alkyl or aryl), or $Tf_2N^-$ (Tf=trifluoromethanesulfonyl), wherein the alkyl, alkenyl, alkynyl and aryl groups are optionally substituted with one or more substituents, which are not particularly limited;

a polymethine compound represented by Formula 3:

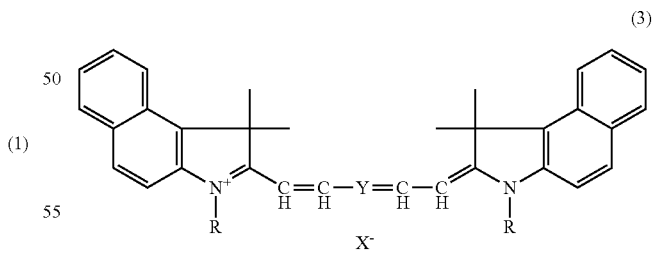

wherein each R is independently a hydrogen atom, an alkyl group, an alkylalkoxy group or an alkylsulfonic acid group, and $X^-$ is a halogen ion, $RCO_2^-$ (R=alkyl or aryl), $RSO_3^-$ (R=alkyl or aryl), $NO_3^-$, $ClO_4^-$, $PF_6^-$, $SbF_6^-$, $BF_4^-$, $BR_4^-$ (R=alkyl or aryl), or $Tf_2N^-$ (Tf=trifluoromethanesulfonyl), the alkyl, alkenyl, alkynyl and aryl groups being optionally substituted with one or more substituents, which are not particularly limited;

an anthraquinone compound represented by Formula 4:

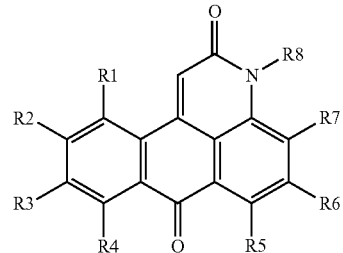

(4)

wherein R1 to R8 are independently a hydrogen atom or an alkyl group;

a phthalocyanine compound of Formula 5: and

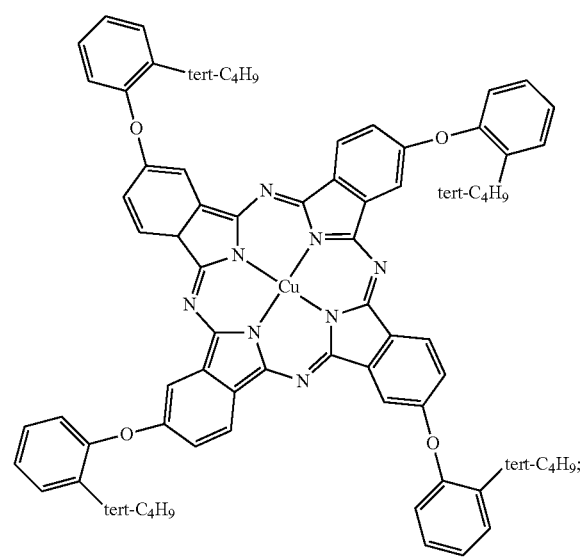

(5)

and
a naphthalocyanine compound represented by Formula 6:

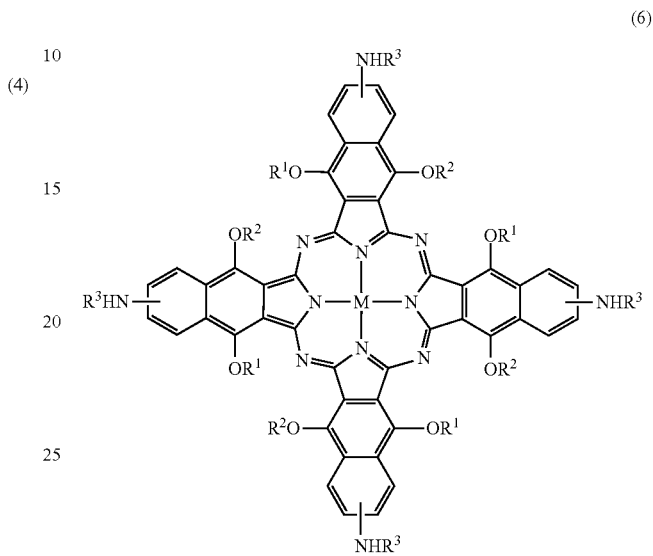

(6)

wherein $R^1$ to $R^3$ are independently a hydrogen atom, a hydroxyl group, an amino group, a hydroxysulfonyl group, an aminosulfonyl group, or a $C_1$-$C_{20}$ alkyl group, and M represents two N-bonded hydrogen atoms, or is a divalent metal atom, a trivalent substituted metal atom, a tetravalent substituted metal atom, tin-doped indium oxide, or antimony-doped tin oxide.

Commercially available colorants suitable for use in the present embodiment include, e.g., YKR-3080, YKR-3070 and YKR-2900 (Yamamoto Chemicals Inc., Japan), IR series such as IRG-022, IRG-023, IRG-024 and IRG-068 (Nippon Shokubai Co., Ltd., Japan), MIR101 (Midori Kagaku Co., Ltd., Japan), AM and IM series (Nagase, Japan), CIR-1080, CIR-1081, CIR-1083, CIR-1085, CIR-1085F, CIR-RL, FD-HB and FD-RH (Nippon Carlit Co., Ltd., Japan), and PDC 220C and PDC 680 (Nippon Kayaku Co., Ltd., Japan).

In addition to the above-mentioned colorants, metal oxides may also be used for the purpose of blocking near-infrared rays. Examples of such metal oxides include tin-doped indium oxide and antimony-doped tin oxide.

The colorant is preferably present in an amount of about 0.01 to about 30 parts by weight, based on 100 parts by weight of the binder resin.

Examples of solvents that can be used in the production of the optical film include: ketone compounds, such as methyl ethyl ketone (MEK), methyl isobutyl ketone (MIBK), acetone, cyclohexanone, and cyclopentanone; ether compounds, such as dioxolane, dioxane, and dimethoxyethane; and aromatic compounds, such as toluene and xylene. These solvents may be used alone or as a mixture of two or more thereof.

The optical film may further include a color correction colorant. For example, the color correction colorant may include one or more anthraquinone colorants represented by Formulae 7 to 11:

(7)
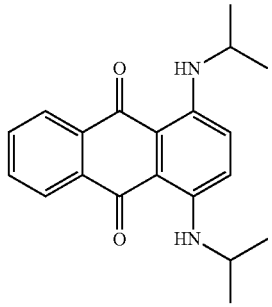

(8)
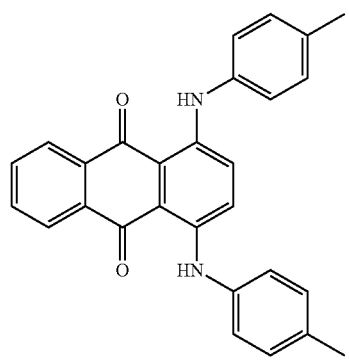

(9)
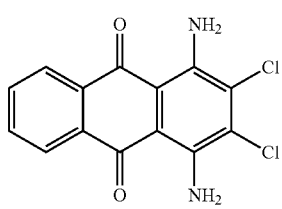

(10)
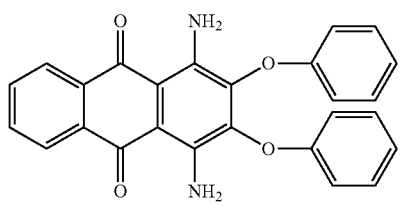

(11)
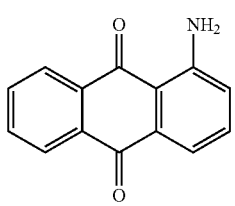

the perinone colorant of Formula 12:

(12)
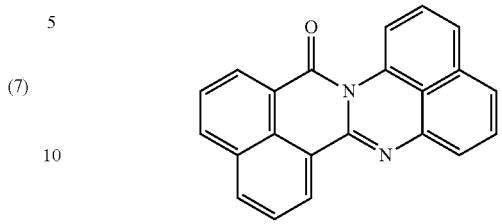

the methine colorant of Formula 13:

(13)
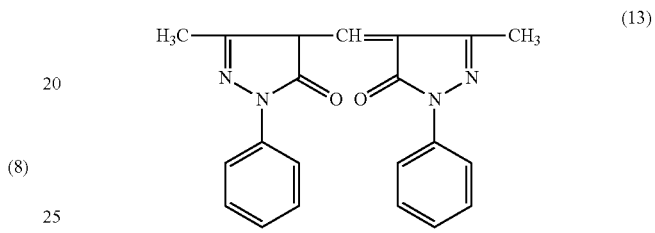

monoazo colorants, disazo colorants, etc., and mixtures thereof. The use of the monoazo colorant and the disazo colorant is preferred.

Aminoanthraquinone colorants as the anthraquinone colorants are commercially available under the trade names Green-5B, Blue-RR, Redvio-RV, Violet-R and Green-G from M. Dohmen GmbH; a commercially available product of the perinone colorant is Red A2G (M. Dohmen GmbH); and the disazo colorants are commercially available under the trade names Black KB and Black K from M. Dohmen GmbH and the trade name Yellow 93 ($C_{21}H_{18}N_4O_2$) from Yabang Dyestuff Co., Ltd., China. However, the kind of the colorant used in the present embodiment is not limited to the above-mentioned colorant products.

The color correction colorant is preferably present in an amount of about 0.0001 to about 30 parts by weight, based on 100 parts by weight of the binder resin.

The near-infrared absorbing layer of the optical film according to an embodiment may exhibit a transmittance of 30% or less, and a difference in transmittance of 20% or less between the maximum transmittance and the minimum transmittance, in the wavelength range of 900 nm to 1,100 nm.

The coating solution composition, which may be a mixture of the near-infrared absorbing colorant, the transparent, impact resistant copolymer resin, and the solvent, may be applied by roll-to-roll coating. Depending on the type of coating equipment, the coating solution composition may be used in various coaters capable of smooth coating, such as die coaters, gravure coaters, reverse coaters, knife coaters, and comma coaters.

The optical film according to an embodiment may be applied to any film whose optical transparency is maintained, and any film whose color and transmittance can be adjusted by the use of dyes and pigments.

Another embodiment provides a display filter including the optical film. A non-limiting application of the display filter is a plasma display. For example, the display filter according to an embodiment may be applied to near-infrared blocking films as color correction films and neon light blocking films for plasma displays. The display filter according to an embodiment may effectively block electromagnetic waves in the near-infrared region to prevent malfunction of infrared devices such as remote controllers.

The following Example and Comparative Example are provided in order to set forth particular details of one or more embodiments. However, it will be understood that the embodiments are not limited to the particular details described. Further, the Comparative Example is set forth to highlight certain characteristics of certain embodiments, and are not to be construed as either limiting the scope of the invention as exemplified in the Example or as necessarily being outside the scope of the invention in every respect.

Example 1

Figure 2:
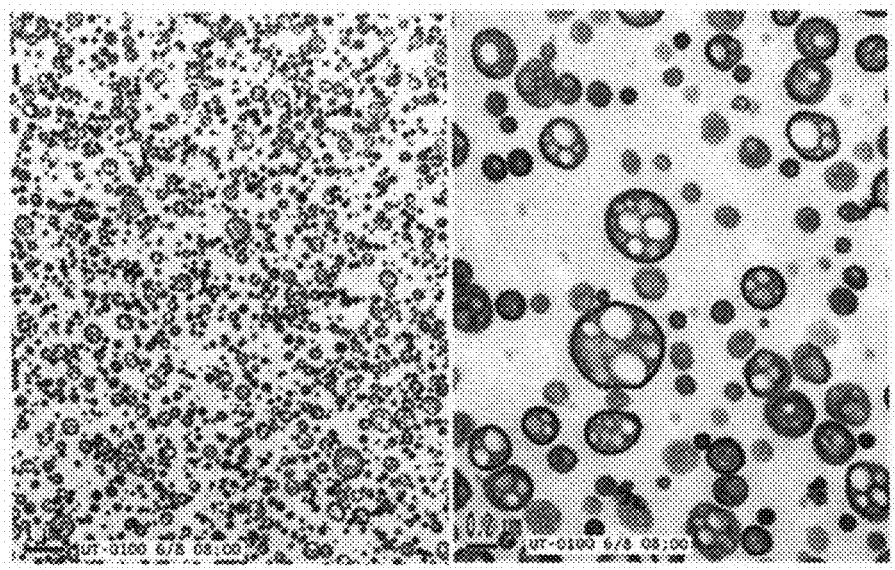
FIG. 2 illustrates transmission electron microscopy (TEM) images of fine butadiene rubber particles contained in a copolymer resin used in Example 1.

0.15 g of a colorant (PDC 680, Nippon Kayaku, Co., Ltd., Japan) was mixed with and sufficiently dissolved with stirring in 8 g of methyl ethyl ketone. A transparent ABS resin (UT-0100, Cheil Industries, Inc., Korea) was dissolved in methyl ethyl ketone as a solvent to prepare a resin solution having a solid content of 40%. 17 g of the resin solution was added to the colorant solution, followed by stirring for a sufficient time to prepare a coating solution. The coating solution was coated on a PET film (A4100, Toyobo Co., Ltd., Japan) as a transparent substrate, and dried at 80° C. for 1 minute to form an optical film. The transparent ABS resin (UT-0100, Cheil Industries, Inc., Korea) contained butadiene rubber particles having an average diameter of 0.2 µm. Transmission electron microscopy (TEM) images of the fine butadiene rubber particles contained in the transparent ABS resin are shown in FIG. 2.

Comparative Example 1

The procedure of Example 1 was repeated except that 17 g of an acrylic binder resin (Halshybrid IRG-205, Nippon Shokubai Co., Ltd., Japan) was used instead of the transparent ABS resin.

[Evaluation of Physical Properties]

Experimental Example 1

Measurements of Total Light Transmittance and Haze of the Optical Films Including the Resins In order to compare the total light transmittance and the haze of the resin used in Example 1 with those of the resin used in Comparative Example 1, optical films were produced using the respective resins only without the use of the colorant. The total light transmittance and haze values of the optical films were measured using a haze meter (NDH2000, Nippon Denshoku Industries Co., Ltd., Japan). The results are shown in Table 1.

Reference Example 1

A transparent ABS resin (UT-0100, Cheil Industries Inc., Korea) was dissolved in methyl ethyl ketone as a solvent to prepare a resin solution having a solid content of 40%. 17 g of the resin solution was mixed with 8 g of methyl ethyl ketone, followed by stirring for a sufficient time to prepare a coating solution. The coating solution was coated on a PET film (A4100, Toyobo Co., Ltd., Japan) as a transparent substrate, and dried at 80° C. for 1 minute to form an optical film.

Reference Example 2

The procedure of Reference Example 1 was repeated except that 17 g of an acrylic binder resin (Halshybrid IRG-205, Nippon Shokubai Co., Ltd., Japan) was used instead of the transparent ABS resin.

TABLE 1

|  | Reference Example 1 | Reference Example 2 |
|---|---|---|
| Total light transmittance (%) | 90.5 | 90.3 |
| Haze (%) | 0.5 | 0.6 |

As can be seen from the results in Table 1, the optical film including the transparent ABS resin used in Example 1 had total light transmittance and haze values comparable to those of the optical film including the optical resin IRG-205 used in Comparative Example 1.

Experimental Example 2

Transmittance Measurement

Figure 3:
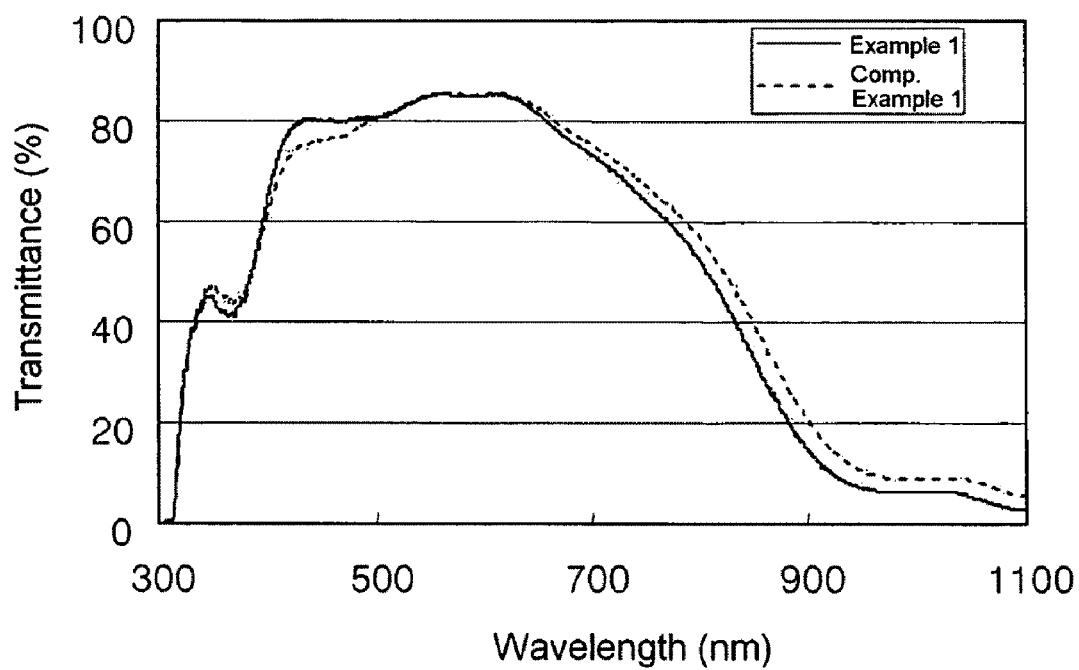
FIG. 3 illustrates a graph showing changes in the transmittance of optical films produced in Example 1 and Comparative Example 1 as a function of wavelength.

The transmittance of each of the optical films produced in Example 1 and Comparative Example 1 was measured using a spectrophotometer (Lambda 950, Perkin-Elmer). The results are shown in FIG. 3. Particularly, the maximum transmittance A and the minimum transmittance B of the optical filter in the wavelength range of 900 nm to 1,100 nm were measured. The results are shown in Table 2 and FIG. 3.

Experimental Example 3

Impact Resistance Measurement

Each of the optical films produced in Example 1 and Comparative Example 1 was cut to a size of 4 cm×6 cm. The specimen was attached to a 3 mm thick glass plate using a pressure-sensitive adhesive and affixed to a falling ball impact tester. When a spherical ball weighing 150 g fell freely down from different heights, a height where and impact energy when the glass plate was broken into pieces were measured. The results are shown in Table 2.

TABLE 2

|  | Example 1 | Comparative Example 1 |
|---|---|---|
| Maximum absorption wavelength (nm) | 900 | 900 |
| A (%) − B (%) | 13.6 | 20.3 |
| Height (cm) where glass plate was broken | 30 | 17 |
| Energy (J) when glass plate was broken | 0.441 | 0.2499 |

The results in Table 2 show that the optical film of Example 1 had a transmittance of 30% or less, and a transmittance difference between the maximum transmittance A and the minimum transmittance B in the wavelength range of 900 nm to 1,100 nm of lower than 20%, indicating effective blocking of electromagnetic waves in the near-infrared region. The optical film of Comparative Example 1 showed optical properties comparable to the optical film of Example 1 but was inferior to the optical film of Example 1 in terms of impact resistance.

These results indicate that the optical film of the according to an embodiment may be used to improve the impact resistance of a color correction film for a plasma display without any significant difference in optical properties when compared to conventional products. From the results in Experimental Example 2, it is evident that the optical film according to an embodiment may effectively block electromagnetic waves in the near-infrared region to prevent malfunction of remote controllers, and may be highly resistant to impact. Consequently, a display filter using the optical film of the present invention may block near-infrared rays in the range of 900 nm to 1,100 nm and may have high impact resistance.

A general optical film may use various kinds of colorants such as anthraquinone, phthalocyanine, dithiol-metal complex and diimmonium colorants. These optical films may effectively block near-infrared rays, but may suffer from poor impact resistance, e.g., due to the use of acrylic resins as materials for near-infrared absorbing films.

In contrast, as described above, an embodiment relates to an optical film and a display filter that block near-infrared rays in the range of 900 nm to 1,100 nm and have high impact resistance. The optical film may be used for suppressing near-infrared ray transmittance. In an implementation, the optical film may include a near-infrared absorbing layer composed of at least one colorant and a transparent copolymer resin. The colorant may have a maximum absorption wavelength in the range of 900 nm to 1,100 nm and the copolymer resin may contain fine rubber particles. The optical film may effectively block near-infrared rays and have high impact resistance. Another embodiment relates to a display filter using the optical film. The optical film and the display filter of the present invention may effectively block near-infrared rays in the range of 900 nm to 1,100 nm to prevent malfunction of infrared devices such as remote controllers. In addition, the optical film and the display filter of the present invention may be highly resistant to impact.

Example embodiments have been disclosed herein, and although specific terms are employed, they are used and are to be interpreted in a generic and descriptive sense only and not for purpose of limitation. Accordingly, it will be understood by those of skill in the art that various changes in form and details may be made without departing from the spirit and scope of the present invention as set forth in the following claims.

What is claimed is:

1. An optical film, comprising: a near-infrared absorbing layer, the near-infrared absorbing layer containing: at least one colorant having a maximum absorption wavelength in the range of 900 nm to 1,100 nm, and a transparent copolymer resin containing fine rubber particles, wherein: the copolymer resin has a total light transmittance of 90% or more and a haze of 2% or less, the copolymer resin includes a compound resin of one or more of an acrylonitrile butadiene styrene copolymer resin, a styrene butadiene styrene copolymer resin, and a styrene butadiene copolymer resin, a difference in refractive index between the fine rubber particles and a matrix resin of the copolymer resin is 0.01 or less, and the near-infrared absorbing layer has a transmittance of 30% or less, and a transmittance difference between a maximum transmittance and a minimum transmittance is lower than 20% in the wavelength range of 900 nm to 1,100 nm.

2. The optical film as claimed in claim 1, wherein the fine rubber particles have an average diameter of 1 µm or less.

3. The optical film as claimed in claim 1, wherein the fine rubber particles have an average diameter of 0.7 µm or less.

4. The optical film as claimed in claim 1, wherein the difference in refractive index between the fine rubber particles and the matrix resin is 0.005 or less.

5. The optical film as claimed in claim 1, wherein the compound resin of the copolymer resin includes one or more of the acrylonitrile butadiene styrene copolymer resin, the styrene butadiene styrene copolymer resin, and the styrene butadiene copolymer resin; and one or more of ethylene vinyl acetate copolymer, ethylene ethyl acrylate copolymer, an olefin polymer, a polycarbonate, an acrylic copolymer, and a polymethacrylate.

6. The optical film as claimed in claim 5, wherein the fine rubber particles include one or more of a butadiene rubber, an acrylic rubber, a nitrile rubber, a chloroprene rubber, and a chlorosulfonated polyethylene rubber.

7. The optical film as claimed in claim 1, wherein a total light transmittance of the optical film is 90% or more and a haze of the optical film is 2% or less.

8. The optical film as claimed in claim 1, wherein the near-infrared absorbing layer has:
a transmittance in the wavelength range of 900 nm to 1,100 nm of 30% or less, and
a transmittance difference between a maximum transmittance and a minimum transmittance in the wavelength range of 900 nm to 1,100 nm of lower than 20%.

9. The optical film as claimed in claim 1, wherein the colorant includes a thiol nickel complex, a diimmonium compound, a polymethine compound, an anthraquinone compound, a phthalocyanine compound, a naphthalocyanine compound, or a mixture thereof.

10. The optical film as claimed in claim 1, wherein the copolymer resin is present in amount of about 10 to about 90 parts by weight, based on 100 parts by weight of total solid content.

11. The optical film as claimed in claim 1, wherein the colorant is present in an amount of about 0.01 to about 30 parts by weight, based on 100 parts by weight of the copolymer resin.

12. The optical film as claimed in claim 1, further comprising at least one color correction colorant, the at least one color correction colorant including one or more of an anthraquinone colorant, a perinone colorant, a methine colorant, a monoazo colorant, and a disazo colorant.

13. The optical film as claimed in claim 1, wherein the near-infrared absorbing layer is formed by coating a coating solution containing the colorant, the copolymer resin as a binder resin, and a solvent on a transparent substrate.

14. A display filter comprising the optical film as claimed in claim 1.

15. The optical film as claimed in claim 1, wherein the copolymer resin is present in amount of about 30 to about 70 parts by weight, based on 100 parts by weight of total solid content, and the colorant is present in an amount of about 0.01 to about 30 parts by weight, based on 100 parts by weight of the copolymer resin.

* * * * *